Figure 1:
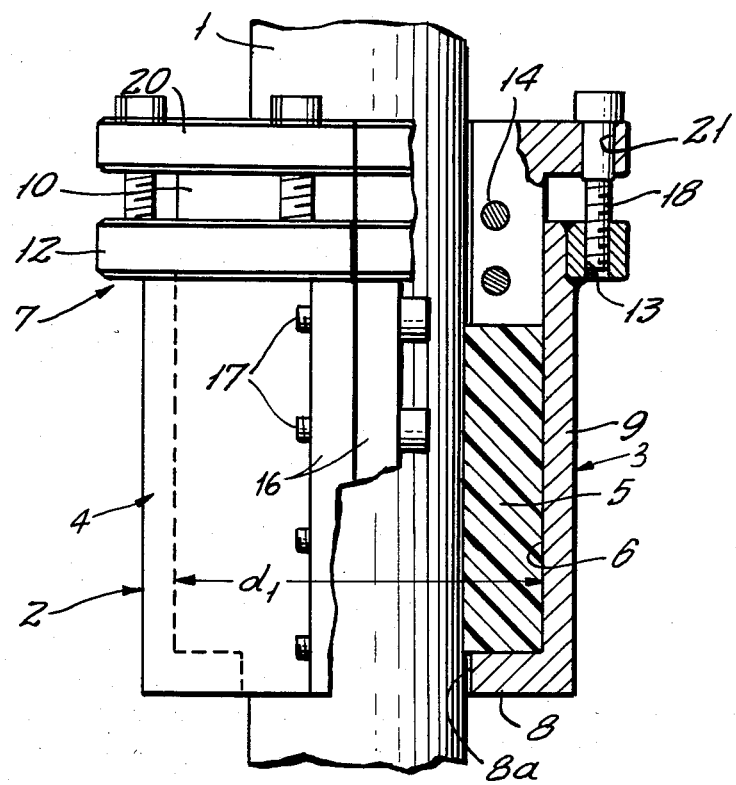

United States Patent [19]

Sala

[11] Patent Number: 4,659,868

[45] Date of Patent: Apr. 21, 1987

[54] APPARATUS FOR RESTRICTING WATER PROPAGATION ALONG A SUBMERGED CABLE

[75] Inventor: Angelo Sala, Merate, Italy

[73] Assignee: Societa' Cavi Pirelli S.p.A., Milan, Italy

[21] Appl. No.: 792,441

[22] Filed: Oct. 29, 1985

[30] Foreign Application Priority Data

Oct. 31, 1984 [IT] Italy .................. 23418 A/84

[51] Int. Cl.[4] .................. H02G 1/00
[52] U.S. Cl. .................. 174/23 R; 138/99; 174/10; 174/135; 277/104; 277/105
[58] Field of Search .................. 174/10, 23 R, 65 SS, 174/135, 151; 277/4, 104, 105, 106, 113, 114, 35, 44, 45, 47, 50, 51; 138/99

[56] References Cited

U.S. PATENT DOCUMENTS

| | | | |
|---|---|---|---|
| 582,109 | 5/1897 | Wood | 277/104 |
| 631,867 | 8/1899 | Beaver | 138/99 |
| 3,055,972 | 9/1962 | Peterson | 174/151 |
| 3,697,089 | 10/1972 | Jacisin et al. | 174/65 SS X |
| 3,744,822 | 7/1973 | Arnold | 138/99 X |

FOREIGN PATENT DOCUMENTS 154307  5/1963  U.S.S.R. .................. 174/65 SS

Primary Examiner—Laramie E. Askin
Attorney, Agent, or Firm—Brooks, Haidt, Haffner & Delahunty

[57] ABSTRACT

A device for constricting an electric cable used underwater for restricting the flow of water lengthwise of the cable when its sheath is perforated intentionally or accidentally. The device comprises a rigid hollow cylinder which fits around the cable with spacing between the cable and the interior wall of the hollow cylinder and has an end wall with an opening for the passage of the cable through the hollow cylinder. The opposite end of the hollow cylinder has an exterior flange, and the space between the interior wall thereof and the cable is filled with an elastomeric or plastomeric sleeve. An annular body which fits around the cable and into the hollow cylinder so as to engage the sleeve has an external flange by which the body may be pressed into the hollow cylinder and thereby compress the sleeve and, hence, the cable.

8 Claims, 2 Drawing Figures

APPARATUS FOR RESTRICTING WATER PROPAGATION ALONG A SUBMERGED CABLE

The present invention relates to a device for restricting or preventing water propagation along a submerged cable.

In submerged cables, water may penetrate into the cable by reason of cuts effectuated for repair purposes, or else as a result of some leakages or infiltrations during cable operation.

This invention can be made use of especially at the time of repairing submerged cables, when it is necessary to cut the cable and bring the two cable ends up to the water surface. However, it can also be used, either provisionally or permanently, for isolating a cable length for the purpose of arresting the spreading of the water already present inside the cable as a result of some infiltration.

Since the main advantages of the invention are obtained when the cable is cut for repair purposes, the following detailed description will be directed to such a case, but it will be apparent to those skilled in the art that the use of the device is not limited to such a case.

Submerged cables, either of the power or telecommunications type, generally provide protective means for protecting against the spreading of water inside them. These distributed protective means have, however, proved to be insufficient when the cable has to be cut for bringing the two cable ends up to the surface for repair purposes and/or for substituting a cable length.

In such cases, a considerable quantity of water can penetrate into the cable, and spread along it, before the two cable extremities are brought up to the surface. This happens particularly when the cable is laid at very deep levels, both because of the time needed for reaching the surface, and because of the high pressure of the water which facilitates its penetration.

Suggestions have been made to choke the cable with a clamp, before cutting it, which should compress the several layers forming the cable, for impeding penetration through the inevitable interstices present in the cable. This type of counter-measure does not offer a sufficient guarantee that water will not enter the cable and, on the contrary, it often worsens the phenomenon by ovalizing the interstices inevitably present between the layers.

Hence, in repairing a submerged cable, the probability of water penetrating into the cable and spreading along it is accepted, and this fact leads to the replacement of significant lengths of cable with the associated jointings.

Finally, it must be kept in mind that every adopted limiting device has to be applied to the cable below the water level and under precarious working conditions so that it is not possible to resort to obstructing or clamping devices which are theoretically efficacious but are complex to install.

Applicant has invented a low cost device which is very simple to use and which allows for preventing, in an efficacious way, the entry of water into the cable after this latter has been cut.

The device of the invention allows for applying a limited pressure (and hence, does not require any special equipment) which is uniformly distributed around the cable surface so as to effectively close, without any non-symmetrical deformations, the inevitable interstices through which the water could penetrate into the cable.

In this way, replacement of relatively long portions of the cut cable ends (which are always oversized for safety reasons) can be avoided, with all the drawbacks involved and the added repair costs, such as the costs of the replaced material, the increased number of joints, the overall time consumed for these operations, etc.

The invention comprises a device for restricting the propagation of water in a submerged cable, characterized by the fact of comprising a rigid cylindrical body that is applicable around the cable for defining with it an annular chamber, an elastomeric or plastomeric material sleeve housed in such chamber, and means for progressively reducing the volume of the chamber so that the sleeve, by being deformed, exercises a pressure that is radially distributed on the cable.

According to a preferred embodiment, the cylindrical body and the means for reducing the volume are each formed by at least two parts which may be assembled around the cable prior to cutting it.

Figure 2:
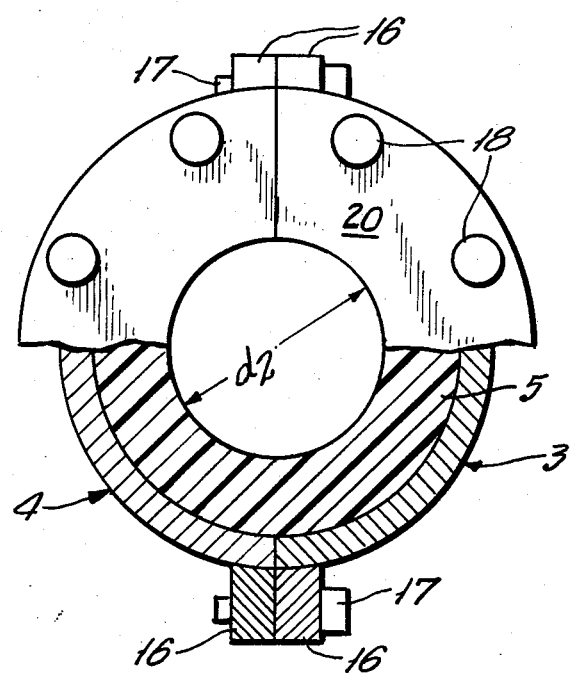

Other objects and advantages of the present invention will be apparent from the following detailed description of the presently preferred embodiments thereof, which description should be considered in conjunction with the accompanying drawings in which:

FIG. 1 is a side view, partially in cross-section, of the device of the invention assembled on a cable; and FIG. 2 is an end view, partially in cross-section, of the device of the invention shown in FIG. 1 with the cable omitted.

With reference to the drawing, the device of the invention comprises three basic parts, a hollow cylindrical body 2, an elastomeric or plastomeric sleeve 5 and an annular body 10. The body 10 is connectable with the cylindrical body 2 and movable axially with respect to it.

The hollow cylindrical body 2 is made out of a rigid material, preferably a metal, and comprises a central portion 9, having an inner diameter $d_1$ greater than the outer diameter of the cable 1 for which it is intended, and two end portions, respectively 7 and 8. The portion 8 acts as stop means and is constituted by an end wall, integral with the central portion and having an opening $8a$ of a diameter $d_2$ substantially equal to the outer diameter of the cable to which the device is to be applied. The end portion 7 comprises a flange 12 protruding from the body 2 and it has a plurality of peripheral, threaded holes 13, only one of which is shown in the drawing.

As a matter of construction, the flange 12 can be, advantageously, a separate piece and joined to the cylindrical body 2 by conventional means, such as by welding. For applying it to the cable, the body 2 preferably is constructed in two separate halves 3 and 4, each one having corresponding axial flanges 16, which are assembled on the cable by means of the flanges 16 and the screws 17. As an alternative, and depending upon the cable-sizes, the body 2 could be formed by three or more parts which may be assembled around the cable through similar means or by some other known type of means.

Once mounted on the cable, the body 2 defines an annular chamber 6 which is closed at one end and inside which there is contained a sleeve 5 made of a deformable material, such as a plastomer or an elastomer. The inner diameter of the sleeve 5 is substantially equal to the outer diameter of the cable whereas the outer diameter of the sleeve 5 is substantially equal to the inner diameter $d_1$ of the body 2.

Sleeve 5 can also be formed by two or more complementary sectors, but, by exploiting its elastic characteristics it is possible, for some cable diameters, to utilize a one-piece, sleeve with a single longitudinal cut which sleeve is applied to the cable by temporarily deforming it. The applied sleeve 5 serves as a reference for assembling the body 2 around the sleeve 5.

After the sleeve 5 and the body 2 are assembled around the cable, the annular chamber 6 is closed by an annular body 10 which may be formed by two or more parts which may be assembled around the cable and held in alignment by known means such as, for example, pins 14 received in holes in adjacent parts. The annular body 10 has a flange 20, preferably of an outer diameter at least as large as the diameter of the flange 12, and provided with peripheral holes 21 corresponding to the threaded holes 13. The body 2 and the annular body 10 are joined together by the screws 18, or by some other conventional means which are appropriate for ensuring both the engaging as well as the progressive axial drawing together of the parts.

When the two parts 10 and 2 are drawn together, for example, by tightening the screws 18, the volume of the annular chamber 6 is progressively reduced and the sleeve 5 is compressed, and subsequent to its deformation, the sleeve 5 exercises a compressing action which is directed radially inwardly and uniformly distributed on the cable.

This radial pressure uniformly compresses the cable and pushes together the underlying layers of the cable so as to eliminate every annular interstice or gap which may be present between these layers and through which the water could penetrate into the cable subsequent to the cutting thereof.

Theoretically, the device according to the invention could prevent any entry of water into the cable but, in actual fact, it could so happen that a minimum quantity of water does manage to find its way into the cable. However, even in this latter circumstance, the actual length of cable which becomes involved in such a phenomenon is extremely limited.

In particular, and with reference to a compound-filled power cable, it is noted that an appreciable route for the entry of the water, subsequent to the cutting, is formed by the annular interstice present between the lead sheath and the insulating layer. Although originally the sheath was made so as to adhere to the insulation, the successive expansions and contractions during use tend to form a narrow annular channel through which the water is able to penetrate. If the choking is carried out with metal clamps in two or more parts, according to the previously known techniques, said annular channel is not completely closed and requires the use of cumbersome equipment in view of the high pressures which are necessary for tightly locking the clamps. Moreover, these clamps must have a limited degree of contact with respect to the cable and do not exercise a distributed radial compressive action. Rather, in correspondence to the locking parts, it is possible for the said channel to become deformed, in this way facilitating the entry of water.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. In combination, a multi-layer, electric, submarine cable having interstices therewithin along which water can spread, said cable being compressible so that the size of said interstices can be reduced by compressing the cable and said cable having a cut therein which is exposed to water, and constricting apparatus for uniformly compressing a length of said cable radially and thereby restricting the flow of water longitudinally of the cable, said appatatus comprising:

a rigid, hollow cylinder having an interior wall of a size greater than the exterior size of the cable to be constricted and surrounding said length of cable adjacent said cut, said cylinder having stop means at one end thereof with an opening therein at least as large as the exterior size of said cable but smaller than the size of said interior wall and said cylinder being free to move with said length of cable;

a compressible and deformable sleeve between said interior wall and said length of cable, said sleeve having an exterior surface engaging said interior wall and having a central bore substantially equal to the exterior size of said length of cable;

an annular body in said hollow cylinder at the opposite end thereof and engageable at one end thereof with said sleeve, said body being movable axially with respect to said hollow cylinder; and compressing means acting between said body and said hollow cylinder and pressing said body against said sleeve and thereby compressing and deforming said sleeve, whereby said sleeve radially compresses said cable and reduces the size of said interstices therein.

2. The combination set forth in claim 1 wherein said hollow cylinder comprises at least two parts separable along an axial plane.

3. The combination set forth in claim 2 wherein said annular body comprises at least two parts separable along an axial plane.

4. The combination set forth in claim 1 wherein said compressing means comprises adjustable means interconnecting said annular body and said opposite end of said hollow cylinder.

5. The combination set forth in claim 1 wherein said sleeve is made of a material selected from the group consisting of elastomeric and plastomeric materials.

6. The combination set forth in claim 1 wherein said annular body is rigid.

7. The combination set forth in claim 1 wherein said hollow cylinder has an exterior flange at said opposite end thereof, said annular body has an exterior flange at the opposite end thereof and said compressing means comprises screw means interconnecting said exterior flange of said hollow cylinder and said exterior flange of said annular body.

8. The combination set forth in claim 1 wherein said sleeve has an axial length greater than the diameter of said cable.

* * * * *